(12) United States Patent
Yoshida

(10) Patent No.: US 11,484,778 B2
(45) Date of Patent: Nov. 1, 2022

(54) GAME TENDENCY ANALYSIS SYSTEM, AND COMPUTER PROGRAM AND ANALYSIS METHOD

(71) Applicant: Konami Digital Entertainment Co., Ltd., Tokyo (JP)

(72) Inventor: Takahiro Yoshida, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 0 days.

(21) Appl. No.: 17/002,951

(22) Filed: Aug. 26, 2020

(65) Prior Publication Data

US 2020/0384346 A1 Dec. 10, 2020

Related U.S. Application Data

(63) Continuation of application No. PCT/JP2019/009345, filed on Mar. 8, 2019.

(30) Foreign Application Priority Data

Mar. 15, 2018 (JP) .............................. JP2018-048027

(51) Int. Cl.
A63F 1/18 (2006.01)

(52) U.S. Cl.
CPC ........ *A63F 1/18* (2013.01); *A63F 2300/6027* (2013.01)

(58) Field of Classification Search
CPC .. A63F 1/18; A63F 13/45; A63F 13/46; A63F 13/47; A63F 13/48; A63F 13/49;

(Continued)

(56) References Cited

U.S. PATENT DOCUMENTS 5,569,082 A * 10/1996 Kaye ....................... G07F 17/32
463/16
5,570,887 A * 11/1996 Christie, Jr. ........ A63F 3/00075
273/261

(Continued)

FOREIGN PATENT DOCUMENTS

JP 2002-301264 A 10/2002
JP 2003-103045 A 4/2003

(Continued)

OTHER PUBLICATIONS

International Search Report dated May 14, 2019 in PCT/JP2019/009345.

(Continued)

*Primary Examiner* — David L Lewis
*Assistant Examiner* — Matthew D Hoel
(74) *Attorney, Agent, or Firm* — Sughrue Mion, PLLC

(57) ABSTRACT

In a game tendency analysis system applied to a game in that a plurality of players compete against each other using an aggregate of a plurality of physical game media, and analyzing a tendency related to constitution of the aggregate used in the game, at least a part of the game media included in an aggregate, which is constituted to be used in the game by each player, is identified, an identification result thereof is separately recorded, as constitution example information which indicates a constitution example of the aggregate, in predetermined constitution example data for each of the aggregates, and a frequent-use media group, which is a combination of game media included in the aggregate with a relatively high frequency, is estimated as an element representing at least a part of the tendency, based on the constitution example data.

9 Claims, 14 Drawing Sheets

(58) Field of Classification Search
CPC .... A63F 13/55; A63F 13/60; A63F 2300/535; A63F 2300/554; A63F 2300/6027; A63F 2300/5533; A63F 2300/558
See application file for complete search history.

(56) References Cited

U.S. PATENT DOCUMENTS

| | | | | |
|---|---|---|---|---|
| 5,662,332 A * | 9/1997 | Garfield | ............... | A63F 1/00 273/308 |
| 5,722,893 A * | 3/1998 | Hill | ............... | A63F 1/14 463/47 |
| 6,132,315 A * | 10/2000 | Miyamoto | ............... | A63F 13/10 463/43 |
| 6,267,678 B1 * | 7/2001 | Kubo | ............... | A63F 13/12 463/40 |
| 6,322,077 B1 * | 11/2001 | Braunlich | ............... | A63F 1/02 273/308 |
| 6,375,566 B1 * | 4/2002 | Yamada | ............... | A63F 1/00 463/43 |
| 6,398,651 B1 * | 6/2002 | Yamada | ............... | A63F 1/00 463/43 |
| 6,544,119 B2 * | 4/2003 | Kubo | ............... | A63F 13/80 463/9 |
| 6,595,851 B1 * | 7/2003 | Kubo | ............... | A63F 13/95 463/47 |
| 6,666,770 B1 * | 12/2003 | Kubo | ............... | A63F 1/18 463/43 |
| 7,371,165 B2 * | 5/2008 | Reizei | ............... | A63F 13/10 273/245 |
| 7,371,178 B2 * | 5/2008 | Yano | ............... | A63F 1/00 463/43 |
| 7,899,848 B2 * | 3/2011 | Yin | ............... | H04L 67/1008 707/831 |
| 7,946,491 B2 * | 5/2011 | Burian | ............... | G06K 7/14 235/462.07 |
| 8,181,963 B2 * | 5/2012 | Gress | ............... | A63F 9/00 463/43 |
| 8,202,155 B2 * | 6/2012 | Uchiyama | ............... | A63F 13/12 463/31 |
| 8,419,535 B2 * | 4/2013 | Miller | ............... | G07F 17/32 463/31 |
| 8,469,361 B2 * | 6/2013 | Gress | ............... | A63F 9/00 463/43 |
| 8,523,648 B2 * | 9/2013 | Gilson | ............... | A63F 13/69 463/11 |
| 8,545,328 B2 * | 10/2013 | Miller | ............... | A63F 1/18 463/43 |
| 8,556,266 B2 * | 10/2013 | Yoshida | ............... | A63F 1/04 273/293 |
| 8,639,214 B1 * | 1/2014 | Fujisaki | ............... | G06Q 20/306 455/406 |
| 8,758,111 B2 * | 6/2014 | Lutnick | ............... | G07F 17/3279 463/16 |
| 8,784,175 B2 * | 7/2014 | Walker | ............... | G07F 17/3286 463/16 |
| 8,932,124 B2 * | 1/2015 | Lutnick | ............... | G07F 17/3225 463/19 |
| 9,094,615 B2 * | 7/2015 | Aman | ............... | H04N 5/268 |
| 9,254,435 B2 * | 2/2016 | Miller | ............... | A63F 1/14 |
| 9,305,427 B2 * | 4/2016 | Walker | ............... | G07F 17/323 |
| 9,508,223 B2 * | 11/2016 | Cannon | ............... | G07F 17/32 |
| 9,536,384 B2 * | 1/2017 | Walker | ............... | G07F 17/3227 |
| 9,595,169 B2 * | 3/2017 | Lutnick | ............... | G07F 17/3276 |
| 9,616,323 B2 * | 4/2017 | Gilson | ............... | A63F 13/58 |
| 9,636,592 B2 * | 5/2017 | Takeuchi | ............... | A63F 13/73 |
| 9,886,766 B2 * | 2/2018 | Madineni | ............... | G06T 7/11 |
| 9,889,378 B2 * | 2/2018 | Takeuchi | ............... | A63F 13/73 |
| 10,099,137 B2 * | 10/2018 | Takeuchi | ............... | A63F 13/58 |
| 10,546,465 B2 * | 1/2020 | Shigeta | ............... | A63F 1/18 |
| 10,551,967 B2 * | 2/2020 | Ha | ............... | G06F 3/04166 |
| 10,553,078 B2 * | 2/2020 | Shigeta | ............... | A63F 1/062 |
| 10,607,452 B2 * | 3/2020 | Shigeta | ............... | G07F 17/3293 |
| 10,632,383 B2 * | 4/2020 | Takeuchi | ............... | A63F 13/58 |
| 10,675,533 B2 * | 6/2020 | Gilson | ............... | A63F 13/40 |
| 10,748,386 B2 * | 8/2020 | Shigeta | ............... | A63F 1/18 |
| 10,755,532 B2 * | 8/2020 | Shigeta | ............... | G07F 17/3293 |
| 10,857,450 B1 * | 12/2020 | Aman | ............... | A63F 13/213 |
| 10,878,656 B2 * | 12/2020 | Shigeta | ............... | A63F 9/24 |
| 10,916,089 B2 * | 2/2021 | Shigeta | ............... | H05K 7/1489 |
| 10,930,120 B1 * | 2/2021 | Ito | ............... | A63F 1/00 |
| 11,210,908 B2 * | 12/2021 | Shigeta | ............... | G07F 17/3293 |
| 11,247,122 B2 * | 2/2022 | Tseng | ............... | G06V 10/44 |
| 11,344,795 B2 * | 5/2022 | Grimes | ............... | G07F 17/3241 |
| 2002/0147042 A1 * | 10/2002 | Vuong | ............... | G07F 1/06 463/40 |
| 2007/0024449 A1 * | 2/2007 | Bilyeu | ............... | G06K 17/00 340/573.1 |
| 2007/0052167 A1 * | 3/2007 | Galatan | ............... | A63F 3/00157 463/40 |
| 2007/0279494 A1 * | 12/2007 | Aman | ............... | H04N 5/278 348/169 |
| 2008/0029602 A1 * | 2/2008 | Burian | ............... | G06K 7/14 235/462.07 |
| 2009/0170595 A1 * | 7/2009 | Walker | ............... | G07F 17/322 463/25 |
| 2010/0234094 A1 * | 9/2010 | Gagner | ............... | G07F 17/3202 463/20 |
| 2010/0276887 A1 * | 11/2010 | Yoshida | ............... | A63F 1/04 273/293 |
| 2010/0306249 A1 * | 12/2010 | Hill | ............... | G06F 16/9535 707/769 |
| 2010/0311489 A1 * | 12/2010 | Miller | ............... | A63F 1/12 463/31 |
| 2010/0311490 A1 * | 12/2010 | Miller | ............... | G07F 17/3293 463/16 |
| 2011/0049234 A1 * | 3/2011 | Yoshida | ............... | H04N 1/00358 235/380 |
| 2012/0100901 A1 * | 4/2012 | Kirsch | ............... | G07F 17/3293 463/11 |
| 2013/0143633 A1 * | 6/2013 | Walker | ............... | G07F 17/3227 463/16 |
| 2013/0281173 A1 * | 10/2013 | Gilson | ............... | A63F 13/235 273/293 |
| 2014/0066212 A1 * | 3/2014 | French | ............... | G07F 17/3232 463/43 |
| 2014/0295930 A1 * | 10/2014 | Walker | ............... | G07F 17/323 463/16 |
| 2015/0049946 A1 * | 2/2015 | Madineni | ............... | G06T 7/11 382/173 |
| 2016/0012465 A1 * | 1/2016 | Sharp | ............... | G06Q 20/321 705/14.17 |
| 2016/0045816 A1 * | 2/2016 | Ogilvie | ............... | A63F 1/02 273/293 |
| 2016/0189480 A1 * | 6/2016 | Walker | ............... | G07F 17/3286 463/25 |
| 2016/0271487 A1 * | 9/2016 | Crouse | ............... | A63F 1/00 |
| 2017/0232335 A1 * | 8/2017 | Williams | ............... | A63F 13/58 463/31 |
| 2018/0043259 A1 * | 2/2018 | Wong | ............... | A63F 13/52 |
| 2019/0278457 A1 * | 9/2019 | Ha | ............... | G06F 3/03 |
| 2020/0282304 A1 * | 9/2020 | Tseng | ............... | A63F 13/80 |
| 2020/0282305 A1 * | 9/2020 | Liang | ............... | A63F 9/20 |
| 2020/0316481 A1 * | 10/2020 | Grimes | ............... | A63F 13/213 |
| 2020/0384346 A1 * | 12/2020 | Yoshida | ............... | A63F 13/85 |

FOREIGN PATENT DOCUMENTS

| | | |
|---|---|---|
| JP | 2004-261207 A | 9/2004 |
| JP | 2010-187911 A | 9/2010 |
| JP | 2015-8985 A | 1/2015 |
| JP | 2017-188833 A | 10/2017 |

OTHER PUBLICATIONS

Written Opinion of the International Searching Authority dated May 14, 2019 in PCT/JP2019/009345.

Office Action dated Oct. 16, 2018 from Japanese Patent Office in JP Application No. 2018-048027.

(56) References Cited

OTHER PUBLICATIONS

Office Action dated Feb. 14, 2022 in Korean Application No. 10-2020-7024133.

* cited by examiner

GAME TENDENCY ANALYSIS SYSTEM, AND COMPUTER PROGRAM AND ANALYSIS METHOD

BACKGROUND OF THE INVENTION

Field of the Invention

The present invention relates to a game tendency analysis system or the like that analyzes the tendency of an aggregate in a game played using the aggregate of a plurality of physical game media.

Description of the Related Art

A system for shooting (or recording) a playing status of a game, and adding an effect to the obtained moving image (video) to provide a user with viewing it has been proposed (see, for example, Patent Literature 1). There is a known system in which a game medium used in a game, that uses physical game media, for example, a board game such as chess or shogi, or a card game that uses playing cards, trading cards or the like, is identified on the basis of a bar code provided on the game medium, information recorded on an IC chip disposed on the game medium, or information obtained through image recognition, and an image corresponding to the identification result is added to the playing image of the game to provide a user with viewing it (see, for example, Patent Literature 2).

CITATION LIST

Patent Literature

Patent Literature 1: JP2017-188833A
Patent Literature 2: JP2003-103045A

SUMMARY OF THE INVENTION

In a game in which an aggregate of a plurality of physical game media that are appropriately combined is used, e.g., a deck as a bundle of cards is used, it is important to know how other players constitute the aggregates. For example, if each of players combines game media, and one player can know the tendency regarding how other players constitute the aggregates, the player can utilize the tendency for constituting the aggregate. However, the above-described conventional system simply identifies how the game media are used in the game, and utilizes the identification result in applications such as reproducing the progress of the game from the obtained information. Thus, there is room for further improvement regarding the utilization of the obtained information.

Accordingly, an object of the present invention is to provide a game tendency analysis system or the like that utilizes the identification results of the physical game media used in the game to analyze the tendency of the game.

A game tendency analysis system according to one aspect of the present invention is a game tendency analysis system applied to a game in that a plurality of players compete against each other using an aggregate of a plurality of physical game media, and analyzing a tendency related to constitution of the aggregate used in the game, the game tendency analysis system comprising: a medium identification device identifying at least a part of the game media included in an aggregate which is constituted to be used in the game by each player; a constitution example recording device separately recording an identification result of the medium identification device, as constitution example information which indicates a constitution example of the aggregate, in predetermined constitution example data for each of the aggregates; and a tendency estimation device estimating a frequent-use media group which is a combination of game media included in the aggregate with a relatively high frequency, as an element representing at least a part of the tendency, based on the constitution example data.

A computer program for a game medium tendency analysis system according to another aspect of the present invention is a computer program for use with a game tendency analysis system, which is applied to a game in that a plurality of players compete against each other using an aggregate of a plurality of physical game media and which analyzes a tendency related to constitution of the aggregate used in the game, the computer program configured to cause a computer of the game tendency analysis system to function as: a medium identification device identifying at least a part of the game media included in an aggregate which is constituted to be used in the game by each player; a constitution example recording device separately recording an identification result of the medium identification device, as constitution example information which indicates a constitution example of the aggregate, in predetermined constitution example data for each of the aggregates; and a tendency estimation device estimating a frequent-use media group which is a combination of game media included in the aggregate with a relatively high frequency, as an element representing at least a part of the tendency, based on the constitution example data.

An analysis method according to still another aspect of the present invention is an analysis method for use with a game tendency analysis system, which is applied to a game in that a plurality of players compete against each other using an aggregate of a plurality of physical game media, and which analyzes a tendency related to constitution of the aggregate used in the game, the analysis method comprising: identifying at least a part of the game media included in an aggregate which is constituted to be used in the game by each player; separately recording an identification result of the game media, as constitution example information which indicates a constitution example of the aggregate, in predetermined constitution example data for each of the aggregates; and estimating a frequent-use media group which is a combination of game media included in the aggregate with a relatively high frequency, as an element representing at least a part of the tendency, based on the constitution example data.

DESCRIPTION OF THE EMBODIMENTS

Figure 1:
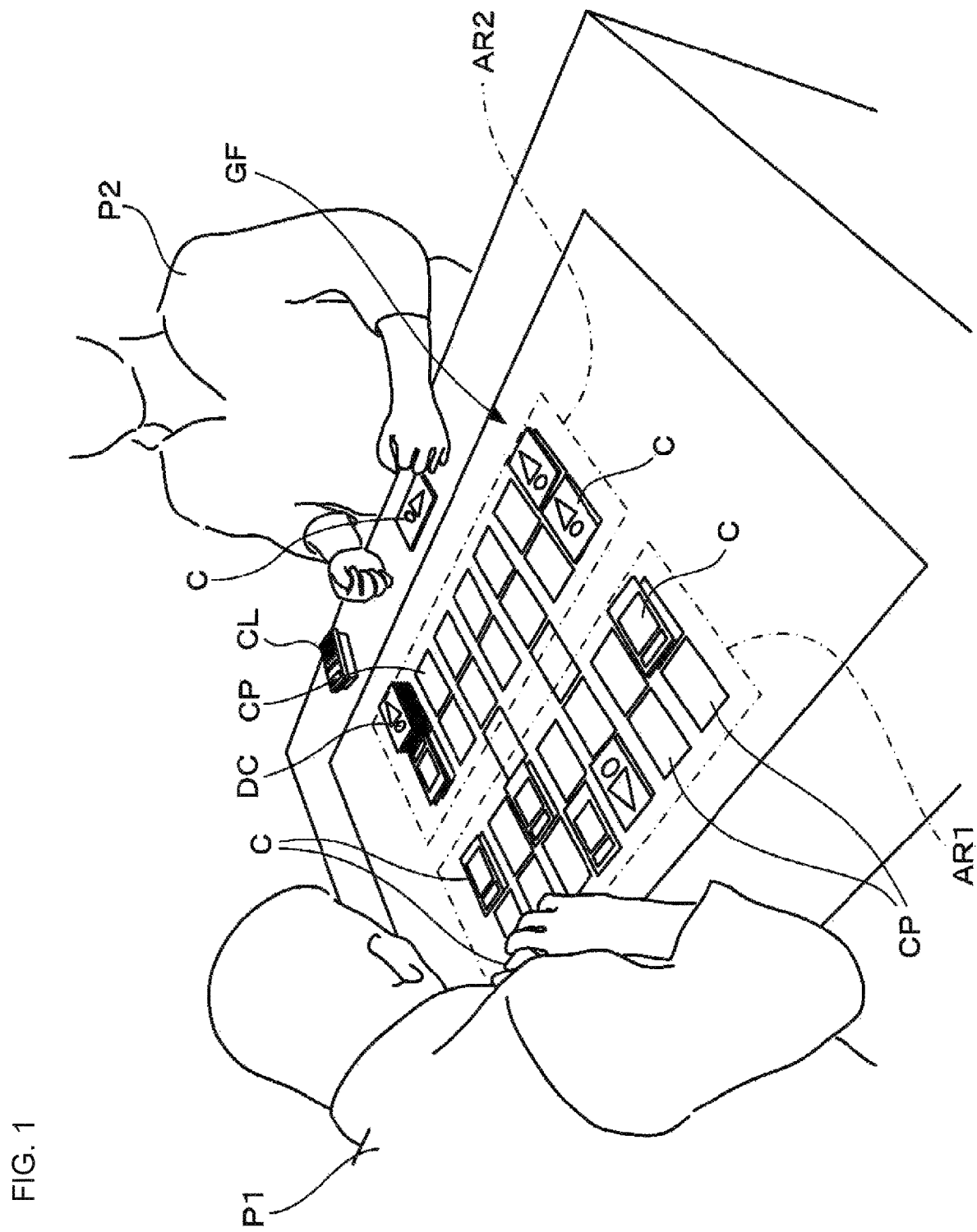
FIG. 1 shows an example of a situation in which a game, i.e., a subject to which a game tendency analysis system according to one embodiment of the present invention is applied, is played.

A game tendency analysis system (hereinafter, sometimes abbreviated as a tendency analysis system) according to one embodiment of the present invention will now be described with reference to the drawings. Incidentally, in each of the drawings, when a plurality of elements, which are similar to each other, are depicted, a reference numeral may be assigned to one or some of such elements, as representatives of all the elements, in order to avoid the complication of the illustration. In the following description, the terms such as "first" and "second" may be used to distinguish elements from each other, but such terms are used for convenience of explanation and have no precedence or other significance.

Referring first to FIG. 1, a game will be described as an example to which the tendency analysis system of this embodiment is applied. The game shown in FIG. 1 is configured as a kind of card competition game in which two players P1 and P2 compete against each other using cards C as an example of physical game media. As is well known, in the card competition game, there are a plurality of types of cards C having different applications, roles, effects and the like in the game. A wide variety of cards are used, for example, cards used to attack opponent's cards, cards used to enhance or weaken the effects of attacks, and cards used to call special characters (sometimes the special characters are referred to as monsters, etc.) and produce specific or unique effects. The cards C are often appropriately included into a deck DC, which means a bundle of cards C, for use in a game. The deck DC is one example of an aggregate of the game media. However, details of the type of the cards C may be appropriately decided according to the contents of the game, and therefore the details of the type of the cards C and the like will not be described in the following description. On the front side (face) of each of the cards C, an image representing a character such as a monster to be symbolized by the card C, an image symbolizing the effect of the card C, a name of the character or the effect of the card C, letters (texts) which indicate attributes, symbols, patterns, etc., are illustrated as appearance elements characterizing the appearance of the card C. On the other hand, the back side of the card C is given a common appearance for all the cards C in order to make it impossible to distinguish the cards C from each other when the cards C are turned over (when the cards are placed their faces down). In FIG. 1, illustration of the details of the individual cards C is omitted, and each of the cards C is visually distinguished depending on whether the front side (face) of the card C in question is up or down.

The game proceeds by utilizing a game field GF as an example of a field where the players P1 and P2 should place (or arrange) the cards C. A plurality of card placing spots CP are set in the game field GF. Each card placing spot CP has generally the same shape and size as a single card C. The card placing spots CP are provided separately in a first area AR1 and a second area AR2 except for two card placing spots CP arranged at the center in the direction in which the players P1 and P2 face each other. The card placing spots CP in the first area AR1 are used by the player P1, and the card placing spots CP in the second area AR2 are used by the other player P2. Basically, one of the players P1 and P2 uses one of the two center card placing spots CP, and the other of the players P and P2 uses the other of the two center card placing spots CP. The card placing spots CP in each of the areas AR1 and AR2 are further divided into a plurality of zones (not shown) depending on applications, roles and the like of the card placing spots in the game. For example, the card placing spots CP on the near-to-the-player side of the right end when viewed from each player P1, P2 is set as a zone in which a plurality of cards C constituting the deck DC are superimposed with the card faces down, and the card placing spots CP on the far-from-the-player side of the right end is set as a zone in which the cards C that have been used in the game or become unusable due to an attack from the other player are superimposed with the card faces up. The number of the card placing spots CP and the classification of the zones may be appropriately decided according to the rules of the game or the like, and a detailed description thereof will be omitted.

Each of the players P1 and P2 prepares the deck DC, which will be used in the game, from a large number of cards owned by the player concerned, and the game proceeds as each player arranges (places) the cards C included in the deck DC in the card placing spots CP appropriately. In the game, a player's movement different from the operation of arranging the cards C in the game field GF is also performed, e.g., the players P1 and P2 hold some of the cards C as hands or place the cards C at an appropriate position outside the game field GF. For example, FIG. 1 shows a situation in which the player P1 holds some of the cards C as the hands, and the player P2 turns the player's cards over (card faces down) and places the cards in front of the player P2. Further, in the game, an external device such as a calculator CL for calculating a numerical value that affects the progress of the game, such as the effect of the attack or a score, is sometimes used.

Figure 2:
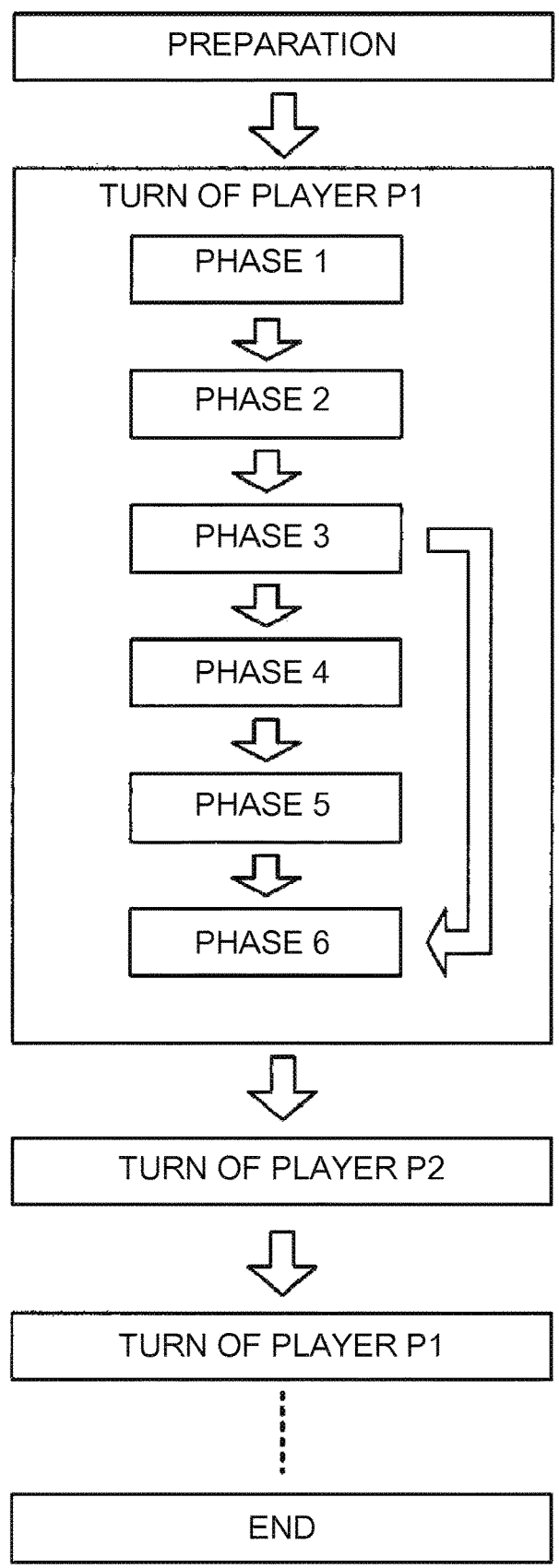
FIG. 2 is a diagram illustrating an example of a progress procedure of the game shown in FIG. 1.

FIG. 2 shows an example of the progress in the game. The game shown by FIG. 1 proceeds in a so-called turn system in which the operation of turn is alternately repeated between the players P1 and P2. First, as a preparation of the game, for example, an operation is performed in which the deck DC of each of the players P1 and P2 is shuffled and placed in the card placing spot CP on the near-to-the-player side of the right end, and a predetermined number of cards C are picked up from the deck DC of the player P1, P2 to hold the cards as the hands. When the preparation is completed, the game starts from the turn of the player who attacks first (for example, the player P1 attacks first). One turn is divided into a plurality of phases. A plurality of phases is a concept for classifying the procedure to be done in a single turn into a plurality of stages according to the content and nature of the procedure. In the example of FIG.

2, one turn is divided into six stages, i.e., from a phase 1 to a phase 6, but this is just an example.

In each phase, the player P1 (or P2) who is given the turn may select an appropriate behavior within a range determined for the phase concerned. An example is as follows. In the phase 1, a card C is picked up from the deck DC, and in the phase 2, the effect of the card C, which is designated as the effect for that an effect processing is to be performed in the phase 2, can be activated. In the phase 3, while using the cards C as appropriate, various behaviors such as calling (summoning) a virtual character such as a monster to be used in a battle, setting a card C having a specific effect such as magic or trap, or activating the effect of the card C are allowed. In the phase 4, fighting (battle) using the cards C is performed. For example, fighting is performed by selecting a card C used by the player P1 (or P2) of its own turn for the attack and another card C as the attack target of the other player P2 (or P1). Instead of or in addition to the card C, the opponent player itself may be the attack target. The outcome of the fighting depends on the parameters such as the attribute and strength of the card C in use. In the phase 5, the same behaviors as in the phase 3 are allowed. In the phase 6, the end of the turn is declared. It should be noted that the battle of the phase 4 can be avoided by the selection made by the player P1 (or P2) to which the turn is given. In that case, the phases 4 and 5 are skipped. The end of one phase may be explicitly indicated by the player's operation of the card C, the physical movements of the player P1, P2 other than the player's operation of the card, such as gestures or the like, or a predetermined utterance of the player P1, P2. When one turn is finished, the turn shifts to the other player P2 (or P1). The game ends as the turns are alternately repeated and the predetermined ending condition is satisfied. The ending condition is satisfied, for example, when the value of a parameter such as the life set for the player P1, P2 decreases to a predetermined value (e.g., 0) by the battle.

In the above-described game, for example, it is possible to identify the card C used in the play of the game by a technique that includes recording the game field GF, extracting an image of the card C from the obtained image, and analyzing the appearance elements captured in the image of the card C. The tendency analysis system of the embodiment may be applied to an application that utilizes information obtained by the identification of the card(s) C to analyze the tendency of the deck DC in the game.

Figure 3:
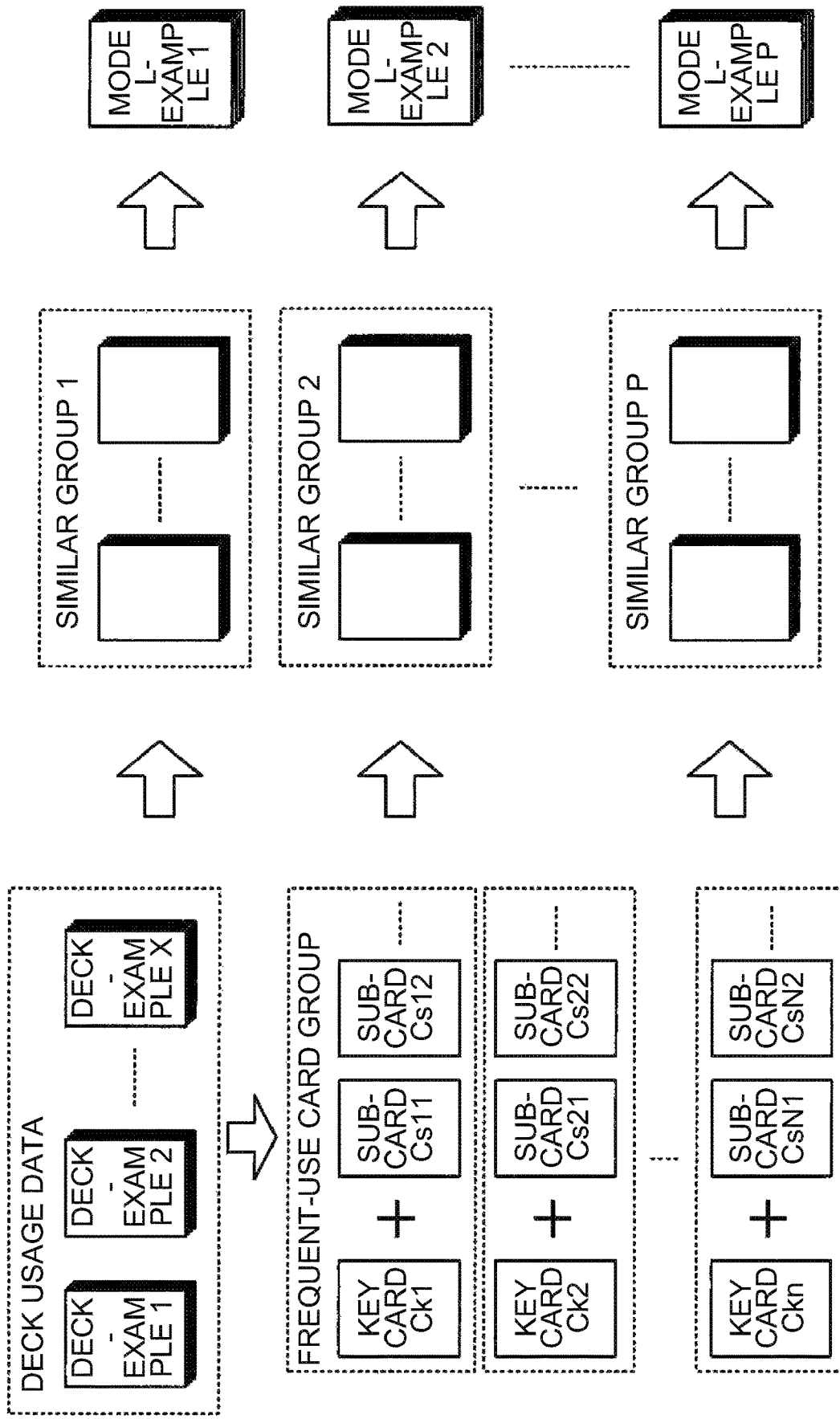
FIG. 3 shows an example of an outline of tendency analysis processing in the game tendency analysis system.

One embodiment of the tendency analysis system will now be described with reference to FIG. 3 to FIG. 8. It should be noted that in the following description, the players P1 and P2 illustrated in FIG. 1 are sometimes represented by the reference numeral PL as the player PL. Referring first to FIG. 3, an example of an outline of the tendency analysis process in the tendency analysis system will be described. In the example of FIG. 3, deck usage data is collected based on the identification results of the cards C used in the game. The deck usage data is the data recorded upon distinguishing the identification results of the cards C used by the player in the game for each deck DC such as deck examples 1, 2, . . . and X. The deck examples correspond to an example of a constitution example of one deck DC actually used by the player in the game. It should be noted that when creating the deck usage data, it is not always necessary to identify all the cards C in each deck DC. If only some of the cards C of the deck DC can be identified, only the identified cards C may be used to create the deck usage data. Reliability may be set in the deck example depending on the number of cards C included in each deck example, or the ratio of the number of identified cards C to the number of cards included in one deck DC, or the like. In other words, the deck example in which more cards C are identified may be regarded as a deck example having a higher reliability, and the reliability may be reflected in the subsequent processing.

Next, key cards are extracted based on the deck usage data, and sub-cards are extracted for each obtained key card. Thereby the combination of the key card and the sub-cards is estimated as a combination of cards C which are incorporated into the deck DC at a high frequency. The key card is a card C which is included in deck examples 1, 2, . . . and X at a relatively high frequency, and corresponds to an example of a major medium. In other words, the key card is a card C that is relatively likely to be incorporated into the deck DC by each player. The frequency in which the card C is included can be specified by detecting the number of deck examples in which the card C is included for each type of the card C. The larger the number of deck examples, the higher the frequency. The key card may be selected from a certain range of cards C starting from the highest frequency. The range used for the key card selection may be set as a range that includes a certain number of cards from the card C having the highest frequency, for example, or may be set as a range that includes cards having the frequency equal to or greater than a predetermined value. FIG. 3 shows an example in which key cards Ck1 to Ckn are selected. When extracting the key card, the frequency of inclusion of the card C may be calculated after weighting the deck example according to the reliability of each deck example.

The sub-card is a card which is associated with the key card and incorporated into the deck DC at a relatively high frequency, and corresponds to an example of an associated medium. The sub-cards are extracted for each key card. For example, when the sub-cards Cs11, Cs12, . . . corresponding to the key card Ck1 are extracted, the deck examples including the key card Ck1 are looked at, the frequency in which the cards C other than the key card are included, i.e., the number of deck examples, is detected for each type of the card C, and the cards which are in a certain range starting from the card C having a relatively large number of deck examples, are specified as the sub-cards Cs11, Cs12, . . . . The combination of the key card Ck1 and the sub-cards Cs11, Cs12, . . . is an example of the combination of the cards C that are included in the deck DC at a relatively high frequency, and corresponds to an example of the frequent-use media group (high frequency media group). In the following description, such a combination is sometimes referred to as a frequent-use card group. In FIG. 3, other examples are shown in which sub-cards Cs21, Cs22, . . . are extracted corresponding to the key card Ck2, and sub-cards CsN1, CsN2, . . . are extracted corresponding to the key card Ckn. It should be noted that the number of sub-cards may be constant or may vary dynamically for each key card. In addition, it is not always necessary that the key card is selected one by one. For example, a combination of two cards C that are used in combination at a considerably high frequency may be set as a pair of key cards, and sub-cards may be extracted for that pair of key cards. In extracting the sub-cards, the frequency at which the cards C are included may be calculated after weighting the deck example according to the reliability of each deck example.

The frequent-use card group, i.e., a combination of key card(s) and sub-cards, is to provide an indicator that classifies the deck DC according to how the player PL constructs the deck DC, and further categorizes the tendency in the constitution (composition) of the deck DC according to the nature of the deck DC, and is estimated as an element representing at least a portion of the tendency in the constitution of the deck DC. That is, when the player PL constitutes the deck DC, the constitution of the cards C included in the deck DC changes according to the concept of the player PL, e.g., a strategy, a policy or the like. For example, the cards C to be included in the deck DC vary depending on whether the deck DC is constituted with an emphasis on attack or the deck DC is constituted with an emphasis on defense. Even if the deck DC is constituted with an emphasis on attack, the constitution of the deck DC may change due to further differences in the concept. Depending on the opponent, the concept of the constitution of the deck DC may change, and the constitution of the deck DC may change correspondingly. When the deck DC is constituted, it is common that the card C having the central role (key role) is first incorporated into the deck DC in order to realize the concept of the player PL, and additional cards C are further selected in consideration of the relevance, compatibility, reinforcement, complementation, and the like with the card C having the key role. The key card is a card C which is presumed to have been selected as the "center" card of the deck DC, and can be estimated as a card having the key role which represents the concept of the player PL or the nature (characteristics) of the deck DC. Further, the sub-card is a card C which is presumed to be highly likely to be incorporated together with the key card, and can be estimated as a card C which is highly likely to be used together with the key card in accordance with the concept of the player PL or the nature of the deck DC. Therefore, by extracting a combination of the key card and the sub-cards, it is possible to obtain an index for categorizing the tendency and nature of the deck DC.

Once the combination of the key card and the sub-cards is estimated, the deck examples included in the deck usage data are classified into similar groups 1 to P based on the similarity to the combinations of the key card and the sub-cards. For example, based on a combination of key cards and sub-cards, the deck examples are classified such that deck examples of similar constitution are collected into a single similar group. Deck examples that include a particular combination of the key card and the sub-cards may be classified in the following manner; such deck examples are regarded as having the same tendency and nature or having similar tendencies and natures and therefore are collected into a single similar group even if the remaining cards C are different. However, for deck examples that include a plurality of combinations of key cards and sub-cards and have ambiguous deck DC natures or the like, exceptional processing may be applied, such as exclusion from the similar group.

Next, model examples 1, 2, . . . and P are estimated for each similar group. The model example may be constituted as, for example, an average or standard example showing the tendency of deck examples included in one similar group. The model example may be constituted to include the above-described frequent-use card group and to also include one or more additional cards C other than the cards C of the frequent-use card group. As an example, the model example may be constituted in such a way that a card or cards C, which are relatively frequently included in the deck examples belonging to the similar group, are added to the frequent-use card group. It should be noted, however, that when the number of the combination of the key card and the sub-cards is already sufficient as the number of cards to be included in the model example, the combination of the key card and the sub-cards may be set as the mandatory cards C in the model example, and the remaining cards C may not be included in the model example. Alternatively, the cards C other than the frequent-use card group may be included in the model example as cards C which have a relatively small effect on the tendency of the deck DC and are optionally chosen, or may be presented separately from the model example. If, in conjunction with the collection of deck usage data, the information of the game in which each deck example is used, for example, the information of the result of the game such as winning/losing in the competition can also be acquired, the model example may be constituted in consideration of the information of the game such that the card C to be added to the model example is selected from the deck example having made a certain result in the competition among the deck examples included in the similar group. In any event, the model example may include at least a combination of the key card and the sub-cards, and an appropriate card or cards C may be optionally added to the model example from the deck examples included in the similar group so that the model example is estimated as a reference example that is possibly used by the player PL when the player PL constitutes the deck DC.

Figure 4:
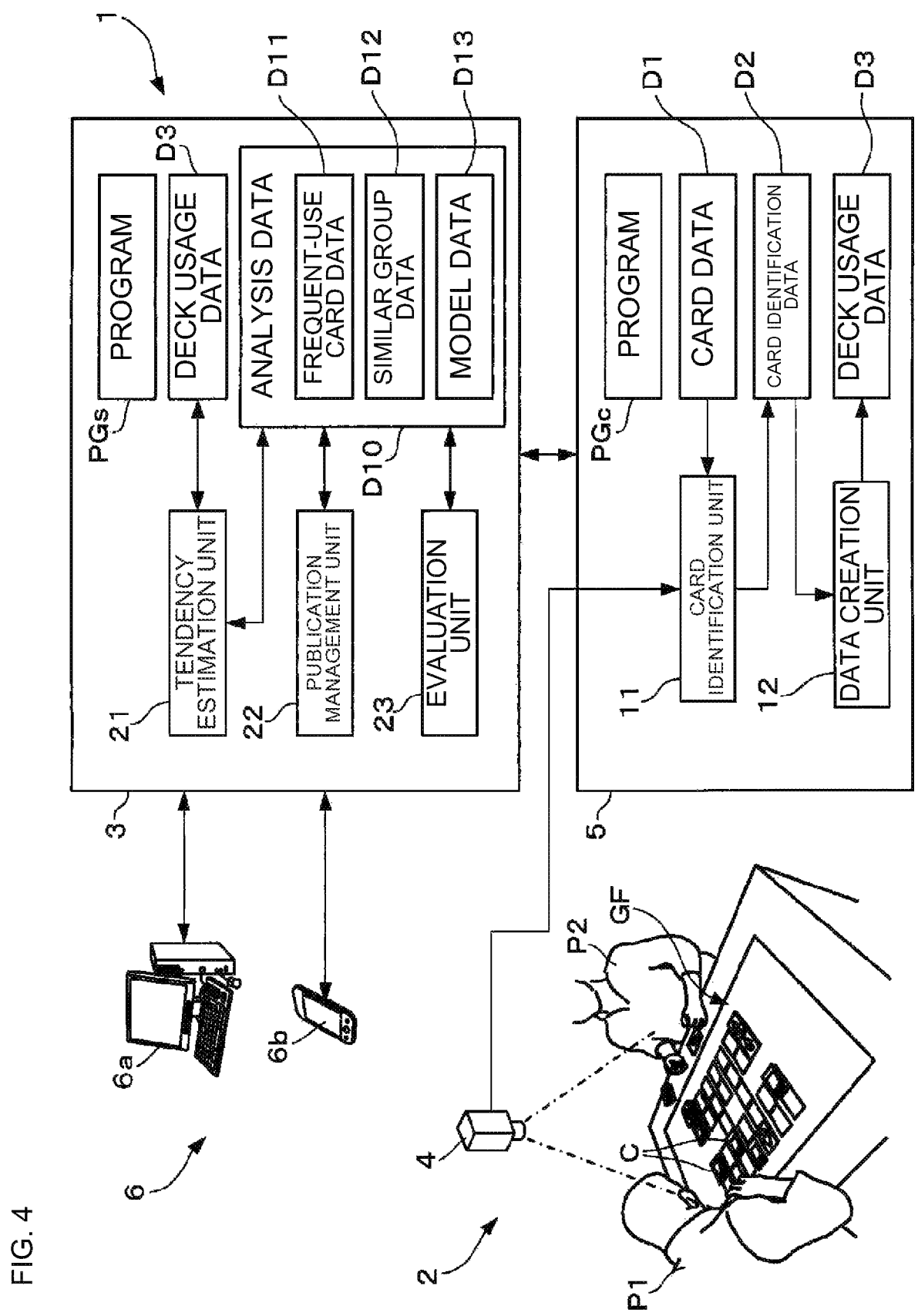
FIG. 4 is a diagram illustrating an example of an overall configuration of a game tendency analysis system according to one embodiment.

FIG. 4 shows a configuration example of the tendency analysis system 1 for realizing a tendency analysis process. The tendency analysis system 1 includes an identification system 2 for collecting deck usage data, and a server system 3 communicatively connected to the identification system 2 via a network such as the Internet and responsible for processing such as the analysis of the deck usage data. The identification system 2 includes a camera 4 as an example of an image-capturing device for recording the game field GF and an identification device 5 for identifying a card C included in the deck DC based on an image captured (acquired) by the camera 4. The identification device 5 is configured as an example of a computer, which includes a CPU and peripheral devices such as internal memory necessary for the operation of the CPU, and functions as a client device to the server system 3. The server system 3 is configured as a single physical server device or a logical server system having a combination of a plurality of physical server devices. The server system 3 also serves as an example of the computer. It should be noted that the server system 3 may be configured as a cloud server. Although FIG. 3 shows a state in which a single identification system 2 is connected to the server system 3, a plurality of identification systems 2 may be connected to the server system 3.

Figure 5:
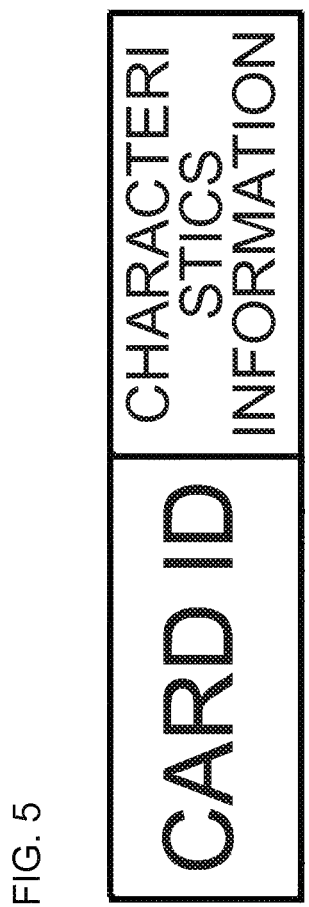
FIG. 5 is a diagram illustrating an example of a record recorded in a card data of FIG. 4.

The identification device 5 includes a card identification unit 11 and a data creation unit 12 as a logical device realized by a combination of a hardware resource of the identification device 5 with a computer program PGc as an example of a software resource. The card identification unit 11 analyzes an image of the card C captured by the camera 4, refers the analysis result to the card data D1 to identify the card C, and records the obtained identification result in the card identification data D2. In the card data D1, as shown in FIG. 5 as an example, a record in which the card ID of the card C and the characteristics information are recorded in association with each other is accumulated. The card ID is an example of media identification information uniquely set for each type of the card C. The characteristics information is information describing the appearance features (characteristics) on the front side (face) of the card C. The appearance of the front side of the card C differs for each type of the card C due to the above-described appearance elements. Therefore, it is possible to specify the type of the card C based on the image, and the characteristics information is generated in advance as information describing the features (characteristics) of the appearance element. If the image captured by the camera 4 is analyzed so as to be able to compare with the characteristics information, the card ID corresponding to the type of the card C can be identified from the image of the card C. Incidentally, information about the specific contents of the card C, such as the name of the character or the like, the attribute, the strength and the effect, is recorded in advance in the data (not shown) in association with the card ID, and if the card ID becomes known, the specific contents of the card C can be determined using the card ID as a clue. Therefore, the identification of the card C is sufficient in the embodiment if at least the card ID is identified. If the card ID matches, the features of the appearance elements of the card C match. In the game, a plurality of cards C having the matching card ID may be incorporated into a single deck DC, and the cards C may be appropriately and selectively used.

Referring back to FIG. 4, the data creation unit 12 refers to the card identification data D2 to determine the card ID of the card C included in the single deck DC used by the player PL, and creates the deck usage data D3 based on the determination result. Further, the data creation unit 12 transmits the created deck usage data D3 to the server system 3 at an appropriate time. Incidentally, the computer program PGc and the data D1 to D3 are appropriately stored in a storage device (not shown) provided in the identification device 5.

Figure 6:
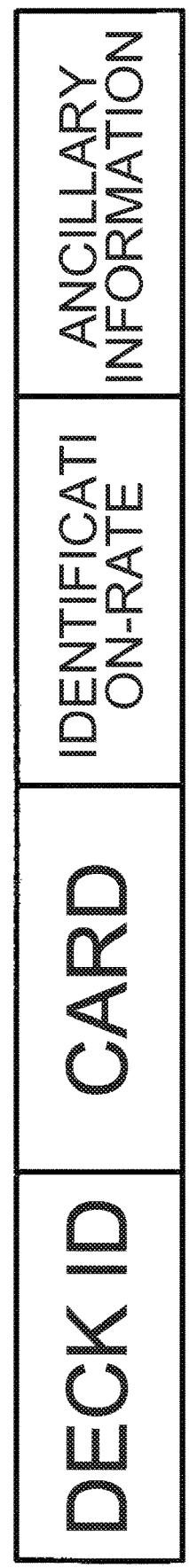
FIG. 6 is a diagram illustrating an example of a record recorded in a deck usage data of FIG. 4.

The deck usage data D3 is aggregation of records in which information of the card C included in a single deck DC is recorded, and corresponds to an example of constitution example data. FIG. 6 shows an example of one record that is recorded in the deck usage data D3. In the record of FIG. 6, the information of the cards C included in the single deck DC as well as identification rate information and supplementary information (ancillary information) is recorded in association with a unique deck ID for each deck DC. The record of FIG. 6 is an example of constitution example information to be recorded in the deck usage data D3. As the information of the card C, for example, the card ID of each of the cards C included in the single deck DC is recorded. The identification rate is information indicating a ratio of the number of cards C identified by the card identification unit 11 to the number of cards C included in the deck DC.

The ancillary information is information acquired by the identification device 5 as information of the game in which the deck DC is used, and is preselected as information to be appropriately referred to in the processing performed in the server system 3. As the ancillary information, information suitable for determining the nature of the deck DC or the like may be selected, e.g., information that can be used to determine the result which the deck DC has given to the game or the influence which the deck DC has given to the game may be selected as the ancillary information. An example is as follows. If it is possible to determine the competition result based on the image acquired by the camera 4, the information of the competition result may be recorded as at least a part of the ancillary information. The ancillary information is not limited to the example determined from the image of the camera 4. For example, if the identification device 5 can acquire the input information of the auxiliary device such as a calculator CL, the input information or the information obtained from the input information may be included in the ancillary information. Alternatively, if an operator of the identification device 5 is able to enter game information via an input device such as a keyboard, at least some of the input information (the entered information) may be included in the ancillary information. It should be noted that the deck ID may not be given by the identification device 5 but may be given for each record in the server system 3. In other words, the identification device 5 may transmit the record to the server system 3 each time a record to be included in the deck usage data D3 is created, and the server system 3 that receives the record may store the record in the deck usage data D3 with the deck ID attached. The record specified by a single deck ID corresponds to a set of deck examples included in the deck usage data shown in FIG. 3.

As shown in FIG. 4, the server system 3 includes a tendency estimation unit 21, a publication management unit 22, and an evaluation unit 23 as logical devices realized by a combination of hardware resources of the server system 3 and a computer program PGs as an example of software resources. The tendency estimation unit 21 accumulates the deck usage data D3 transmitted from the identification system 2, executes various processes shown in FIG. 3 based on the deck usage data D3, and records the execution result in the analysis data D10. The analysis data D10 includes frequent-use card data D11, similar group data D12, and model data D13. Incidentally, in the server system 3 of FIG. 4, the computer program PGs and the data D3 and D10 are held in an appropriate storage device (not shown) included in the server system 3. The deck usage data D3 and the analysis data D10 may be held by a database server.

Figure 7:
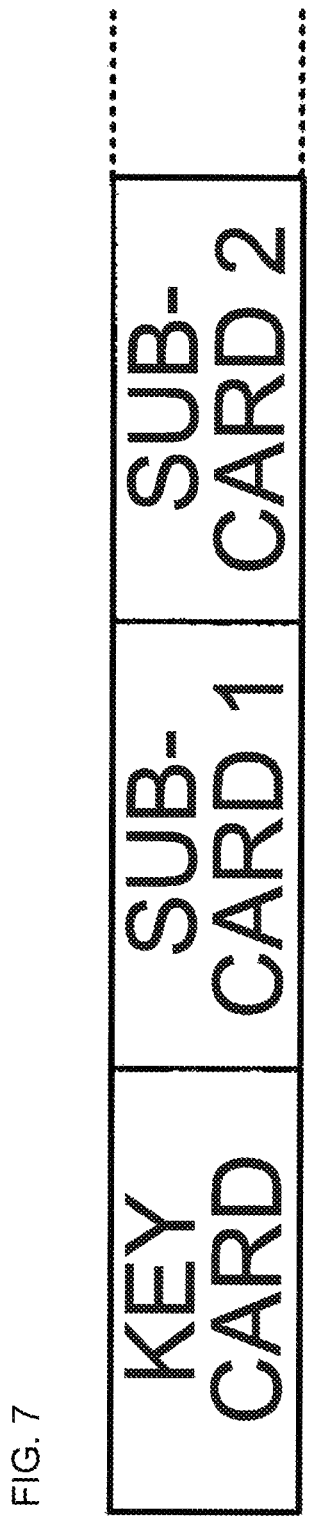
FIG. 7 is a diagram illustrating an example of a record recorded in a frequent-use card data of FIG. 4.
Figure 8:
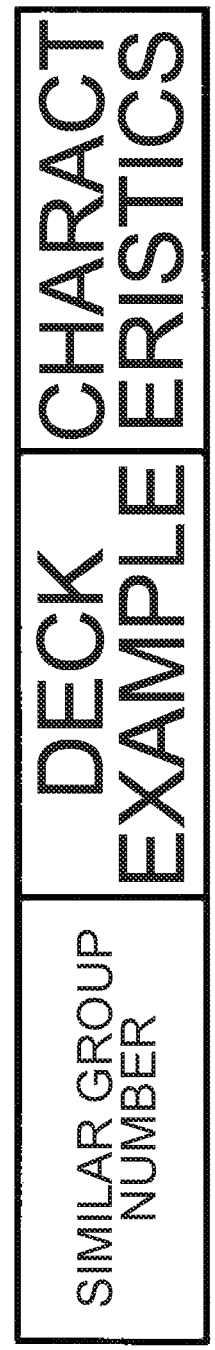
FIG. 8 is a diagram illustrating an example of a record recorded in a similar group data of FIG. 4.

The frequent-use card data D11 is data which has records accumulated therein, with each record storing sub-cards in association with the key card, as illustrated in FIG. 7. In other words, the frequent-use card data D11 is data obtained by recording the analysis results for the combination of the cards C that are included in the deck DC at a relatively high frequency. The similar group data D12 is aggregation of records indicating the correspondence relationship between the deck examples recorded in the deck usage data D3 and the similar group. An example of one of the records recorded in the similar group data D12 is shown in FIG. 8. In the example of FIG. 8, information specifying the deck example (s) included in one similar group and information of characteristics of the similar group are recorded in association with a unique similar group number for each similar group. As an example of the information specifying the deck examples, the deck IDs of the respective deck examples classified into one similar group are recorded. The information of characteristics is information indicating the characteristics of the deck DC for each similar group estimated by the tendency estimation unit 21. For example, various types of information may be recorded as information of characteristics that may serve as a reference when using the similar group data D12, such as information for determining whether the similar group has an attack-oriented or defense-oriented nature, information for determining the strength or weakness of the deck example included in the similar group, or information for determining the reliability of the data based on the identification rate (see FIG. 6) in each of the deck examples included in the similar group.

Figure 9:
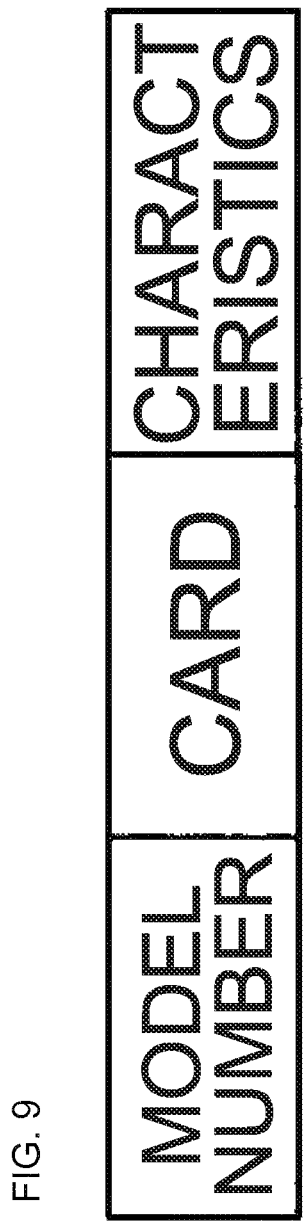
FIG. 9 is a diagram illustrating an example of a record recorded in a model data of FIG. 4.

The model data D13 is aggregation of records that have recorded information about a single model example. FIG. 9 shows an example of one record recorded in the model data D13. An example of one record recorded in the model data D13 is shown in FIG. 9. In the example of FIG. 9, the information specifying the card C included in one model example and the information indicating the characteristics of the model example are recorded in association with a unique model number for each model example. As an example, the card ID of the card C to be included in one model example is recorded as the information for specifying the card C. The information of characteristics is the information which shows the characteristics of the deck DC shown as the model example. The information of characteristics may be the same as the information of the characteristics included in the record of the similar group data D12, and various information such as the nature, strength, weakness and reliability of the model example which can be used as a reference when the model data D13 is used may be recorded as the information of characteristics.

Referring back to FIG. 4, the publication management unit 22, which manages the publication (disclosure) of the analysis data D10 to a terminal device 6, functions as an example of the information publication device (information disclosing device). The terminal device 6 includes, for example, a personal computer 6a used by a user or a portable information communication terminal (e.g., a smartphone) 6b, and is communicably connected to the server system 3 via a predetermined network in a similar manner to the identification device 5. The publication management unit 22 distributes at least a part of the analysis data D10 in a form suitable for use of browsing, reference and the like in the terminal device 6 in response to an access from the terminal device 6. Thus, the user of the terminal device 6 can utilize the analysis data D10, e.g., the user of the terminal device can construct the deck DC to be used in the game while using the terminal device 6 to refer to the model example(s) or the like created by the tendency estimation unit 21. The evaluation unit 23, for example, obtains information indicating the constitution (composition) of the user's deck DC from the terminal device 6, and appropriately compares the obtained deck DC with the analysis data D10 to evaluate the user's deck DC. Therefore, the evaluation unit 23 functions as an example of the evaluation device.

Figure 10:
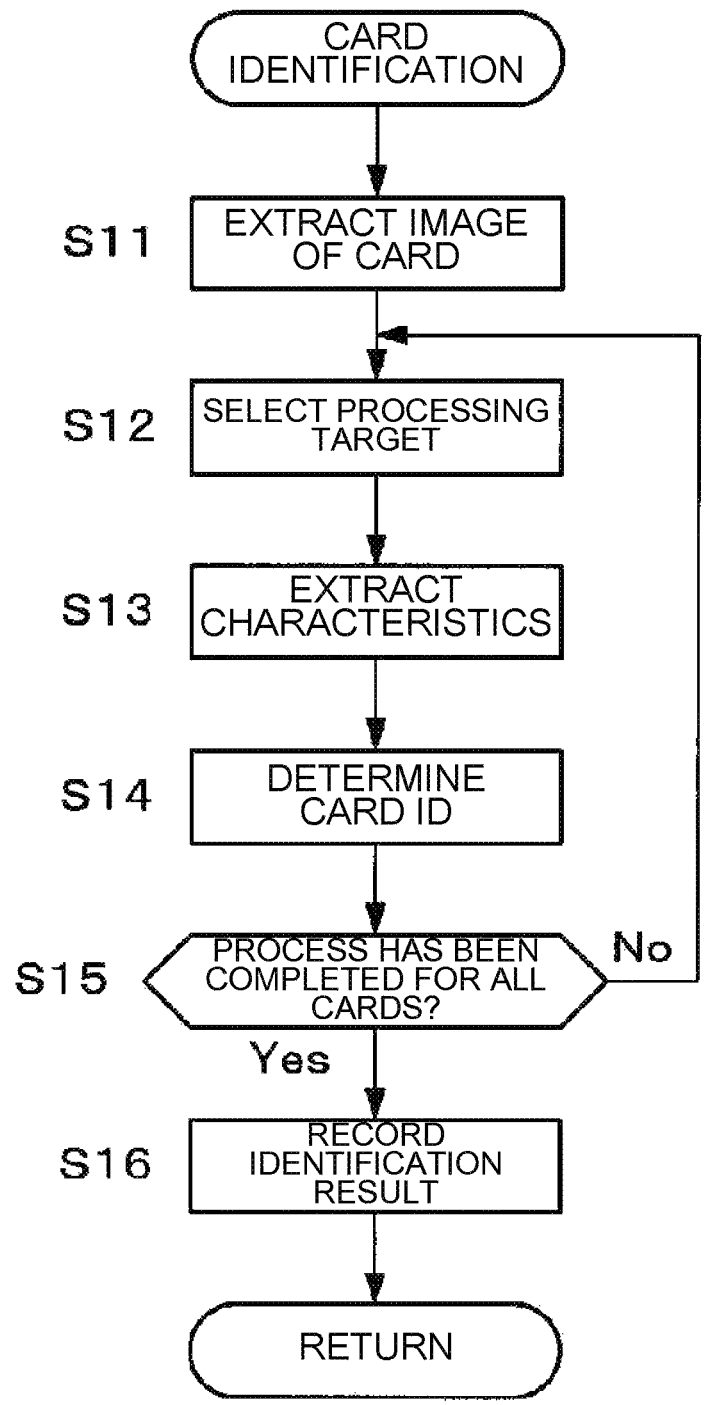
FIG. 10 is a flowchart illustrating an example of a procedure of card identification processing performed by an identification device of FIG. 4.

Next, an example of a specific procedure of various processing executed in the tendency analysis system 1 will be described. First, an example of the processing in the identification device 5 will be described with reference to FIG. 10 and FIG. 11. FIG. 10 shows an example of a procedure of a card identification process which is repeatedly executed by the card identification unit 11 of the identification device 5 at a predetermined cycle during play of a game in order to identify the card C. In the card identification process of FIG. 7, the card identification unit 11 acquires the latest image captured by the camera 4 and analyzes the obtained image to extract the image of the card C placed in the game field GF (Step S11). In Step S11, only the cards C which are placed with their faces up, i.e., the cards placed in a manner that can be identified based on the appearance element, may be the extraction targets. The card identification unit 11 may also determine the position of the card C in the game field GF, and may also identify by which of the players P1 and P2 the extracted card C is being used. Next, the card identification unit 11 selects one card C to be processed from the cards C extracted in Step S11 (Step S12).

Subsequently, the card identification unit 11 extracts the characteristics information of the appearance of the card C to be processed (Step S13). Further, the card identification unit 11 extracts a record having the characteristics information that matches or is most similar to the extracted characteristics information from the card data D1, and determines the card ID of the record as the card ID of the card C (Step S14). Then, the card identification unit 11 determines whether or not the process of determining the card ID has been completed for all the cards C extracted in Step S11 (Step S15). If there is an unprocessed card (or cards) C, the card identification unit 11 returns to Step S12 and selects the processing target from the unprocessed card(s) C. When it is determined in Step S15 that all the cards C have been processed, the card identification unit 11 records the card IDs of the determined cards C in the card identification data D2 as the identification result (Step S16). At this time, the card identification unit 11 records, in the card identification data D2, information that distinguishes by which of the players P1 and P2 the card C has been used. In other words, the identification result is recorded in the card identification data D2 such that it is possible distinguish that the card in question is included in which of decks DC used by the player P1 and P2. The card identification process of this time is completed with the process of Step S16. The card identification unit 11 functions as an example of a medium identification device by executing the processing of Step S11 to Step S16 in FIG. 10.

Figure 11:
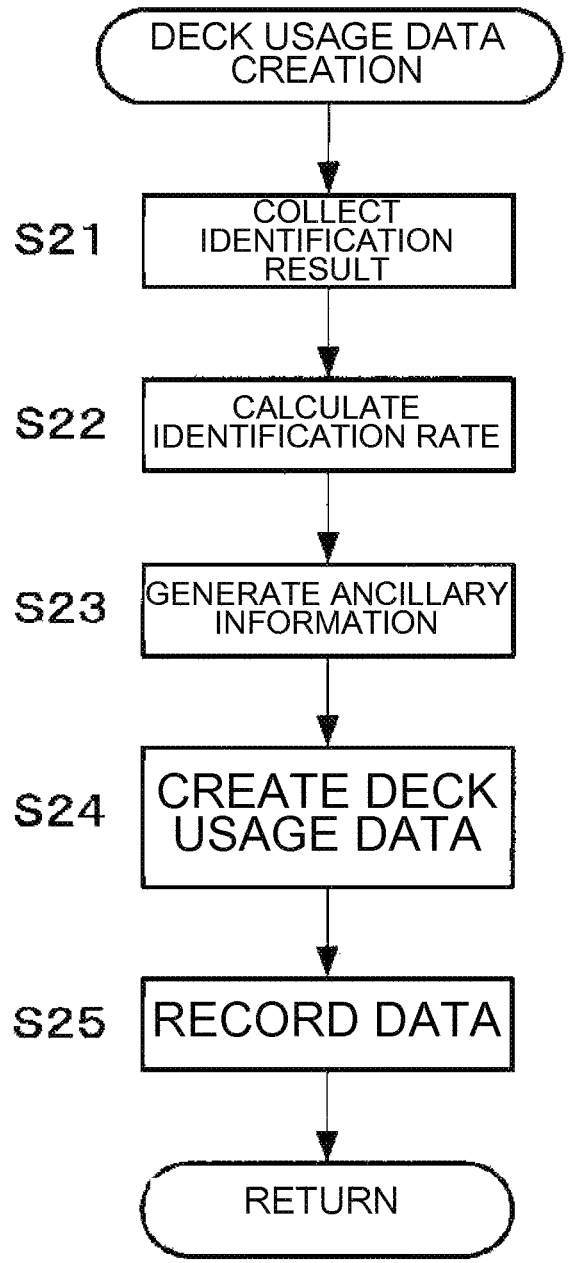
FIG. 11 is a flowchart illustrating an example of a procedure of deck usage data creation processing performed by the identification device of FIG. 4.

FIG. 11 shows an example of the procedure of the deck usage data creation processing executed by the data creation unit 12 of the identification device 5 to create the record of the deck usage data D3. This processing is performed at an appropriate time after one competition is completed and the identification results of the cards C used by each player PL are recorded in the card identification data D2, and is executed for each deck DC, in other words, for each player P1, P2. As the processing of FIG. 11 starts, the data creation unit 12 acquires the identification result of the card C used by one of the players PL from the card identification data D2, and determines the constitution of the deck DC used by the player PL based on the obtained identification result, i.e., the card ID of the card C included in the deck DC (Step S21). The card identification data D2 is aggregation of records repeatedly generated at the appropriate cycle by the card identification unit 11, and the same card C is recorded over a plurality of records. Therefore, for example, in Step S21, the record of the card identification data D2 is analyzed according to the time series, the cards C appearing in the game field GF during the period from the start to the end of the game are specified, and the aggregation of the card IDs of the cards C is determined as the constitution of the deck DC.

Subsequently, the data creation unit 12 calculates the identification rate of the card C in the deck constitution determined in Step S21 (Step S22). The identification rate can be obtained by dividing the number of cards determined in Step S21 by the total number of cards included in the deck DC (the total number of the cards is predetermined). The identification rate may be used as an indicator of the reliability of the above-described deck example. Next, the data creation unit 12 generates the ancillary information to be included in the record of the deck usage data D3 (Step S23). For example, the data creation unit 12 may monitor the image captured by the camera 4 to determine the winning/losing of the game, and create ancillary information such that the determination result is included in the ancillary information. Based on the card identification data D2, the change of the card C in the game field GF may be determined, i.e., how the card C was used may be determined, and the winning/losing or the like may be estimated based on the determination result to generate the ancillary information. Alternatively, the winning/losing or the like may be determined based on the input (entered information) of the operator of the identification device 5, and the ancillary information may be generated based on the input information.

When the ancillary information is generated, the data creation unit 12 creates one record to be included in the deck usage data D3 according to the information obtained in the processing of Step S21 to Step S23 (Step S24), and records the record in the deck usage data D3 (Step S25). The above-described processing is executed for each of the players P1 and P2 so that the deck usage data D3 relating to the deck DC used in a single competition is recorded in the identification device 5. The obtained deck usage data D3 is transmitted to the server system 3 at an appropriate timing. The data creation unit 12 functions as an example of a constitution example recording device by executing the processing of Step S21 to Step S25 in FIG. 11.

Figure 12:
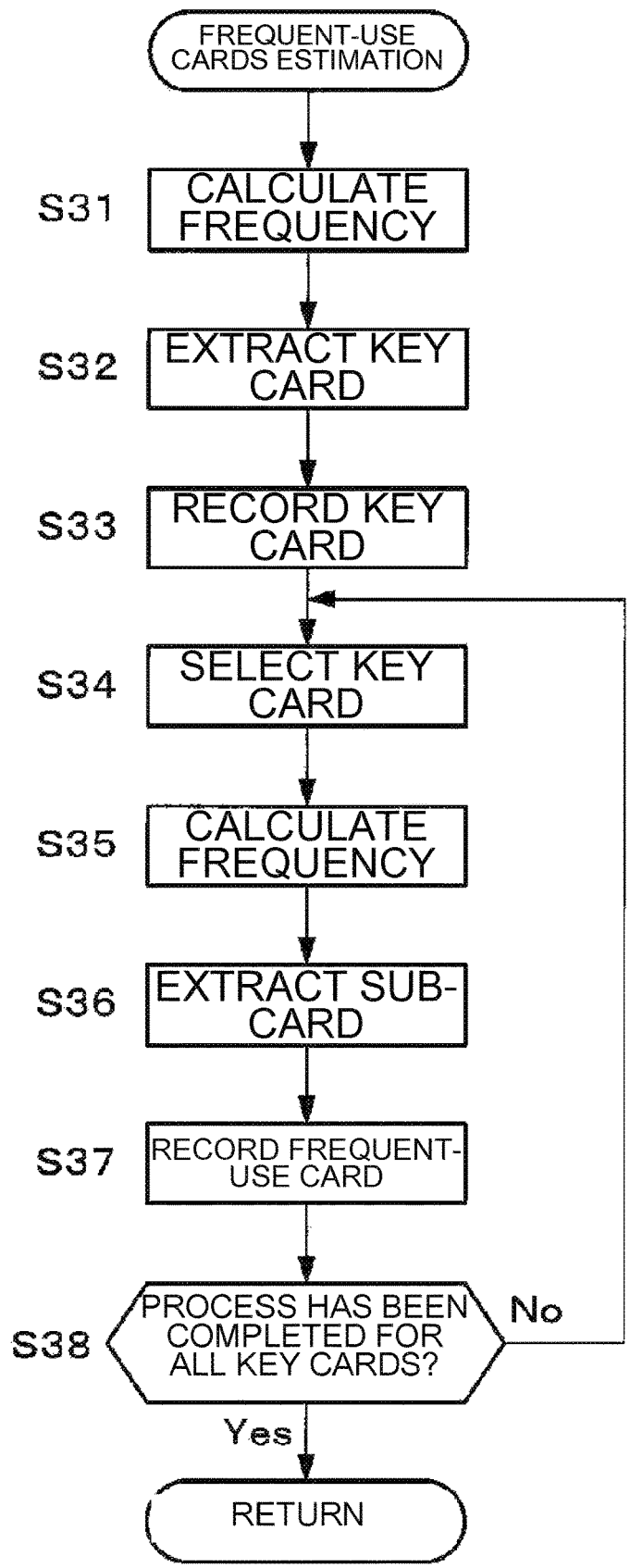
FIG. 12 is a flowchart illustrating an example of a procedure of frequent-use card group estimation processing performed by a server system of FIG. 4.

Next, an example of processing in the server system 3 will be described with reference to FIG. 12 to FIG. 14. FIG. 12 shows an example of the procedure of the frequent-use card group estimation processing executed by the tendency estimation unit 21 to create the frequent-use card data D11 based on the deck usage data D3. The process of FIG. 12 may be performed, for example, at an appropriate time after a sufficient number of records for analysis of the deck DC have been recorded in the deck usage data D3. As the processing of FIG. 12 starts, the tendency estimation unit 21 first calculates, for each card C, the frequency at which each card C recorded in the deck usage data D3 is included in the deck example (Step S31). For example, for each card C recorded in the deck usage data D3, a record of the deck example in which the card C is included is detected, and the number of detections is calculated as the frequency. In this Step S31, the identification rate recorded in each record of the deck usage data D3 may be considered as an example of an index indicating the reliability of the deck example specified by one record. For example, for a record whose identification rate is equal to or higher than a certain level, the number of detection of each card ID recorded in the record may be set to 1, while for a record whose identification rate is relatively low, the number of detection may be reduced to less than 1 according to the identification rate. As an example, when the card ID of a specific card C is recorded in ten records having a sufficiently high identification rate and two records having about half the identification rate, weighting processing according to the identification rate may be applied such that the number of detected records having a low identification rate is multiplied by a factor of 0.5 and the number of detected cards C is calculated as $10 \times 1 + 2 \times 0.5 = 11$. It should be noted that the record, which has an identification rate small beyond the allowable range, may be excluded from the operation target in Step S31.

Subsequently, the tendency estimation unit 21 extracts the key card(s) based on the frequency calculated in Step S31 (Step S32). The processing of Step S32 may be realized by selecting a certain range of cards C in order from the card C having the largest detection number as the key cards. When the key cards are extracted, the tendency estimation unit 21 temporarily records the card IDs of the key cards in the frequent-use card data D11 (Step S33). Next, the tendency estimation unit 21 selects one of the key cards recorded in the frequent-use card data D11 as a key card to be processed (Step S34), and calculates the frequency of the card C recorded in the record of the deck usage data D3 together with the selected key card (Step S35). For example, among the records recorded in the deck usage data D3, a record in which the card ID of the key card selected in Step S34 is recorded is extracted, and for the obtained record (the extracted record), a record of the deck example including the card C is detected for each card C excluding the key card, and the detected number is calculated as the frequency. In this processing, the identification rate may be considered in the same manner as in Step S31, and a record whose identification rate is smaller than the allowable range may be excluded from the operation target.

Subsequently, the tendency estimation unit 21 extracts the sub-card(s) based on the frequency calculated in Step S35 (Step S36). The processing of Step S36 may be realized by selecting a certain range of cards C in order from the card C having the largest detection number as the sub-cards. When the sub-cards are extracted, the tendency estimation unit 21 estimates the combination of the card ID of the key card detected in Step S34 and the card IDs of the sub-cards extracted in Step S36 as one frequent-use card group, generates records in which the card IDs are associated with each other, and records the records in the frequent-use card data D11 (Step S37).

Next, the tendency estimation unit 21 determines whether the processing of Step S34 to Step S37 has been applied to all the key cards extracted in Step S32 (Step S38), and returns to Step S34 if there is an unprocessed key card (or key cards). If it is determined that the processing has been applied to all the key cards in Step S37, the tendency estimation unit 21 finishes the processing of FIG. 12 of this time. The tendency estimation unit 21 functions as an example of the tendency estimating device by executing the processing of Step S31 to Step S38 in FIG. 12.

Figure 13:
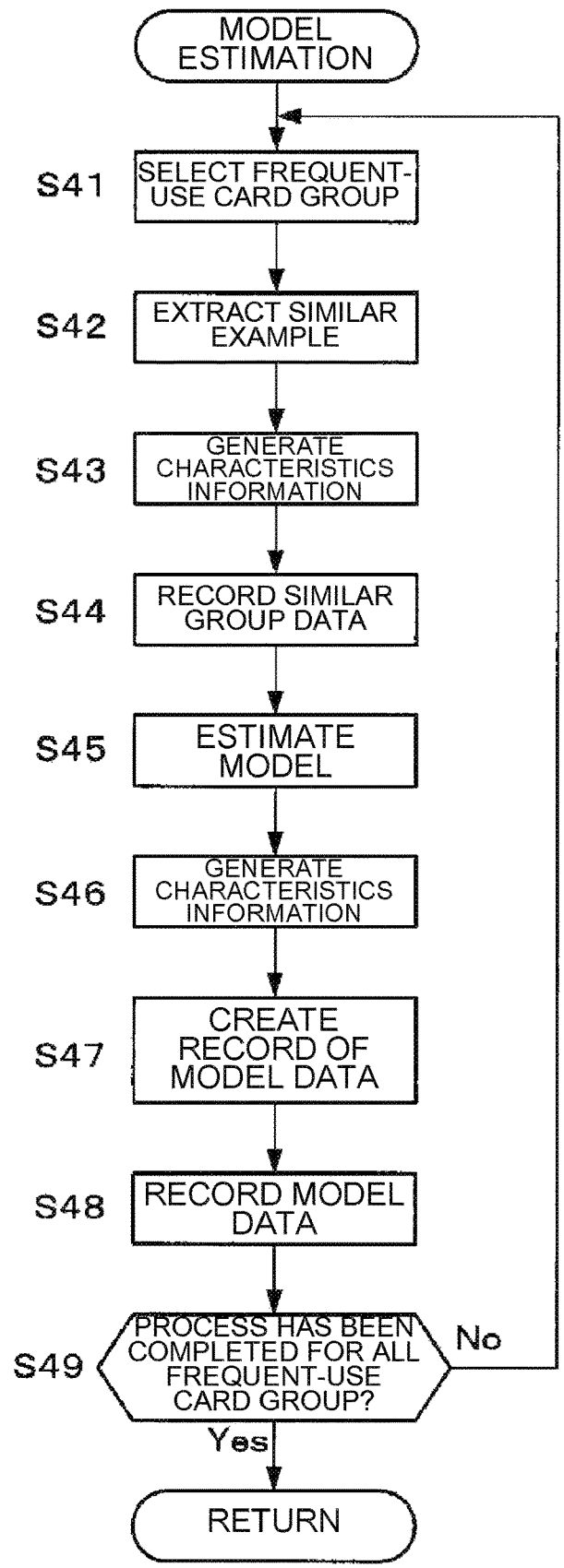
FIG. 13 is a flowchart illustrating an example of a procedure of model estimation processing performed by the server system of FIG. 4.

FIG. 13 shows an example of a procedure of a model estimation process executed by the tendency estimation unit 21 to create the similar group data D12 and the model data D13 based on the frequent-use card data D11. The processing of FIG. 13 may be a processing performed at an appropriate time, for example, after the frequent-use card data D11 is created or updated by the processing of FIG. 12. As the processing of FIG. 13 starts, first, the tendency estimation unit 21 selects a record corresponding to a frequent-use card group (combination of the key card and the sub-cards) from the records recorded in the frequent-use card data D11 as a processing target (Step S41). Subsequently, the tendency estimation unit 21 extracts a record of the deck examples to be classified into the same similar group from the deck usage data D3 while using the combination of the key card and the sub-cards of the record selected in Step S41 as a reference (Step S42). This processing may be performed to extract the deck examples, subject to a condition in which the deck examples include at least the key card and the sub-cards of the frequent-use card group to be processed. Regarding the difference of the cards C other than the frequent-use card group, those cards whose similarities (degrees of the sameness) fall within a certain range may be included into the same similar group. In addition, exceptional processing may be applied, such as excluding a deck example which includes a plurality of frequent-use card groups which makes the nature of the deck DC ambiguous.

Next, the tendency estimation unit 21 generates information of the characteristics to be associated with the similar group with reference to the ancillary information of the record of the deck example extracted in Step S42 (Step S43). The information of the characteristics may be appropriately generated based on the ancillary information of the deck usage data D3. As an example, as described above, the characteristics may be generated as information that provides a clue to know what effect each deck DC included in the similar group has exerted in the game, or what impact each deck DC included in the similar group has given to the game, such as the nature of the deck DC, the type, the win/loss rate of the deck example included in the similar group, etc. After generating the information of the characteristics, the tendency estimation unit 21 generates a record (see FIG. 8) to be recorded in the similar group data D12 based on the processing results of Step S42 and Step S43, and records the record in the similar group data D12 (Step S44).

Next, the tendency estimation unit 21 estimates, based on the processing results in Step S42 and Step S43, a model example corresponding to the similar group recorded in Step S44 as an example of a model of a constitution example in the similar group (Step S45). As mentioned above, the model example may be created by estimating an average or a standard example for the constitution of deck examples included in one similar group. The model example may be configured to include a key card and sub-cards of a frequent-use card group to be processed and also include an appropriate card C selected from the deck examples of the similar group. Subsequently, the tendency estimation unit 21 generates information of the characteristics corresponding to the model example estimated in Step S45 (Step S46). This processing generates information describing the nature of the model example or the like, and the information generated in Step S43 may be utilized as it is for the information of Step S46, or information or the like indicating further characteristics of the model example may be added in Step S46.

Next, the tendency estimation unit 21 creates a record to be recorded in the model data D13 based on the processing results of Step S45 and Step S46 (Step S47), and records the record in the model data D13 (Step S48). Thereafter, the tendency estimation unit 21 determines whether or not the processing of Step S42 to Step S48 has been applied to all the records recorded in the frequent-use card data D11 (Step S49), and returns to Step S41 if there is an unprocessed record (or records). If it is determined that the processing of the entire frequent card group is completed in Step S48, the tendency estimation unit 21 finishes the processing of FIG. 13 of this time.

By appropriately executing the above-described processing, the deck usage data D3 that can be a clue to grasp what kind of deck DC the player PL is using in the game is collected based on the identification information of the cards C used in the game, and the frequency-use card data D11, which indicates the frequent-use card group that can become a clue to know the tendency regarding the constitution of the deck DC, i.e., which indicates a combination of the cards C that are included in the deck DC by the player PL at a high frequency, is created based on the deck usage data D3. By referring to the frequent-use card data D11, a wide variety of deck DCs can be classified into a plurality of similar groups according to their natures, properties, etc., and furthermore, the deck DC as a model example can be estimated for each similar group. Therefore, it becomes possible to utilize the identification results of the cards C as information for grasping the tendency regarding the constitution of the deck DC, and it is possible to expand the use of the identification results of the cards C to effectively utilize the information.

In the above-described embodiment, the publication management unit 22 may appropriately select the information of the frequent-use card data D11, the similar group data D12 and the model data D13 included in the analysis data D10 in response to a request from the user of the terminal device 6 and provide the terminal device 6 with the selected information. Further, the evaluation unit 23 acquires from the terminal device 6 the information of the card C included in the deck DC constituted by the user, and evaluates the deck DC of the player PL based on the comparison between the constitution of the deck DC identified based on the acquired information and the estimation result of the tendency estimation unit 21. An example of processing by the evaluation unit 23 is shown in FIG. 14.

Figure 14:
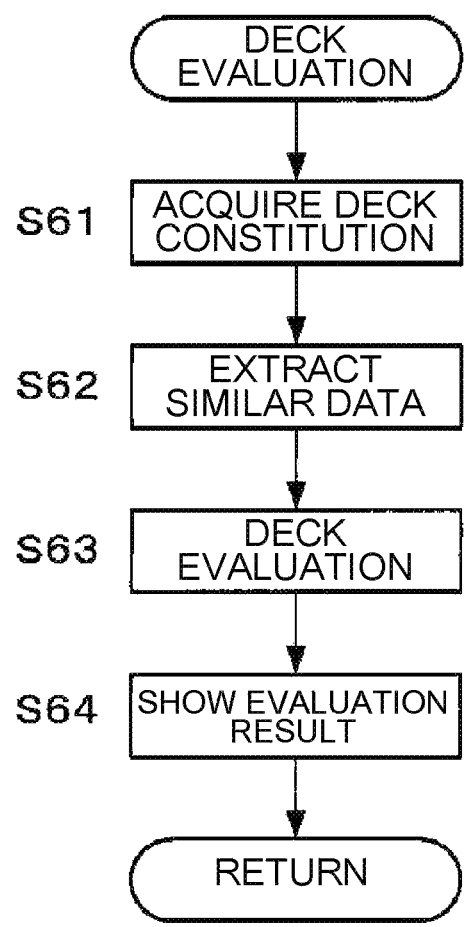
FIG. 14 is a flowchart showing an example of a procedure of deck evaluation processing performed by the server system of FIG. 4.

In the processing of FIG. 14, the tendency estimation unit 21 of the server system 3 acquires information for identifying the constitution of the deck DC from the terminal device 6 (Step S61), and extracts data similar to the deck DC constituted by the user from the analysis data D10 based on the acquired information (Step S62). In this case, the following processing may be applied, for example; the tendency estimation device compares the card ID of the card C included in the deck DC of the user with the frequent-use card group recorded in the frequent-use card data D11 and extracts the record of the frequent-use card group whose similarity is equal to or higher than a predetermined level, or the tendency estimation device compares the card ID of the card C included in the deck DC of the user with the frequent-use card group recorded in the frequent-use card data D11 and extracts the record of the frequent-use card group whose similarity is equal to or higher than a predetermined level, or the tendency estimation device extracts the record of the similar group having a similar constitution to the deck DC constituted by the user from the similar group data D12.

Next, the evaluation unit 23 evaluates the user's deck DC by comparing the constitution of the deck DC acquired in Step S61 with the data (record) extracted in Step S62. For example, the user's deck DC is evaluated by quantitatively calculating a degree of similarity between the user's deck DC and the frequent-use card group or the degree of similarity between the user's deck DC and the constitution of the deck recorded in the similar group data D12. For example, the following processing is acceptable; the higher the degree of similarity, the higher the user's deck DC is evaluated, assuming that this matches the tendency of the player PL constituting the deck DC. Thereafter, the evaluation unit 23 sends the evaluation result of Step S63 to the terminal device 6 to show (present) the evaluation result to the user (Step S64). In this processing, the characteristics information recorded in the similar group data D12 or the like, or evaluation comments or the like prepared by appropriately arranging (editing) the characteristics information in accordance with the user's deck DC may be provided the terminal device 6 as well.

In the example of FIG. 14, the information of the card C included in the user's deck DC is provided from the terminal device 6 to the server system 3, so that the terminal device 6 itself functions as an example of the medium identification device. In this configuration, the input of the information to the terminal device 6 may be appropriately made by using a camera or other input device connected to the terminal device 6, and the user may input the information of the card C using the input device (input interface) such as a keyboard provided in the terminal device 6. Further, the deck DC that is identified with the terminal device 6 by the user may be included in the concept of the aggregate constituted for use in the game. It should be noted, however, that the card IC of the deck DC may be identified by using the identification system 2, and the obtained identification result may be evaluated by the evaluation unit 23. That is, the deck DC itself brought to the place where the game is played may be evaluated by the evaluation unit 23.

The present invention is not limited to each of the above-described embodiments, and may be embodied by making various changes or modifications to the embodiments. For example, although the above-described embodiments estimate the frequent-use card groups, the similar groups, and the model examples as elements that show the tendency in the constitution of the deck DC, the present invention does not require all of the estimations. If the frequent-use card group can be estimated, it is possible to clarify the tendency of what kind of card C should be incorporated into the deck DC according to the concept in constituting the deck DC. Thus, the tendency analysis system may be configured to omit the estimation of the similar groups and the model examples and provide the estimation results of the frequent-use card groups for appropriate utilization. It is not required that a single model example is associated with a single similar group. Two or more model examples may be estimated for a single similar group. It is not always necessary for deck examples included in the deck usage data to be uniquely classified for any one similar group. A set of deck examples may be classified in parallel into two or more similar groups.

The game, i.e., the subject to which the tendency analysis system of the present invention should be applied, is not limited to a competition game which proceeds while the game media are appropriately arranged in a plurality of places of the game field. For example, it is possible to apply the tendency analysis system of the present invention even to a game which proceeds while one or more predetermined number (which may be variable) of cards as game media are sequentially placed in a predetermined field.

In the above-described embodiments, although the card C is identified based on the image captured by the camera 4, the medium identification device is not limited to such an example. For example, an IC chip, a bar code, a two-dimensional code or the like may be mounted or attached as the identification information onto each of the game media used in the game, or onto each of attached or additional elements used in combination with the game media (for example, a sleeve or the like with respect to the card C), and each of the game media may be identified by reading the identification information from the game medium or the like arranged in the field of the game field GF or the like. In this case, it is possible to use a reader for the IC chip, a scanner for the bar code, or the like as the medium information acquiring device. The game medium is not limited to a flat plate-like example such as a card; an appropriate game medium may be used even if the game medium has a three-dimensional shape such as a figure, a piece (chessman) or the like, as long as it is possible to identify the game medium and create the constitution example data. The game media included in an aggregate such as a deck DC used in a game are not necessarily required to be identified based on information obtained during the play of the game. For example, at a stage before the play of the game starts, the cards included in the deck constituted by the player may be sequentially scanned for identification. In such identification, at least a portion of the input operation of the identification information may depend on manual operations, such as manual operations by an operator of the identification device 5.

Various aspects of the present invention derived from each of the above-described embodiments and modifications will be described below. It should be noted that in the following description, to facilitate understanding of each aspect of the present invention, corresponding components illustrated in the accompanying drawings are additionally mentioned in parentheses, but this does not intend that the present invention is limited to the illustrated embodiments.

A game tendency analysis system according to one aspect of the present invention is a game tendency analysis system (1) applied to a game in that a plurality of players (P1, P2) compete against each other using an aggregate (DC) of a plurality of physical game media (C), and analyzing a tendency related to constitution of the aggregate used in the game, the game tendency analysis system comprising: a medium identification device (11, S11 to S16; 6) identifying at least a part of the game media included in an aggregate which is constituted to be used in the game by each player; a constitution example recording device (12, S21 to S25) separately recording an identification result of the medium identification device, as constitution example information (e.g., a record shown in FIG. 6) which indicates a constitution example of the aggregate, in predetermined constitution example data (D3) for each of the aggregates; and a tendency estimation device (21, S31 to S38) estimating a frequent-use media group which is a combination of game media included in the aggregate with a relatively high frequency, as an element representing at least a part of the tendency, based on the constitution example data.

A computer program for a game medium tendency analysis system according to another aspect of the present invention is a computer program (PGc, PGs) for use with a game tendency analysis system (1), which is applied to a game in that a plurality of players (P1, P2) compete against each other using an aggregate (DC) of a plurality of physical game media (C) and which analyzes a tendency related to constitution of the aggregate used in the game, the computer program configured to cause a computer (5, 3) of the game tendency analysis system to function as: a medium identification device (11, S11 to S16; 6) identifying at least a part of the game media included in an aggregate which is constituted to be used in the game by each player; a constitution example recording device (12, S21 to S25) separately recording an identification result of the medium identification device, as constitution example information (e.g., a record shown in FIG. 6) which indicates a constitution example of the aggregate, in predetermined constitution example data (D3) for each of the aggregates; and a tendency estimation device (21, S31 to S38) estimating a frequent-use media group which is a combination of game media included in the aggregate with a relatively high frequency, as an element representing at least a part of the tendency, based on the constitution example data.

An analysis method according to still another aspect of the present invention is an analysis method for use with a game tendency analysis system (1), which is applied to a game in that a plurality of players (P1, P2) compete against each other using an aggregate (DC) of a plurality of physical game media (C), and which analyzes a tendency related to constitution of the aggregate used in the game, the analysis method comprising: identifying at least a part of the game media included in an aggregate which is constituted to be used in the game by each player (S11 to S16); separately recording an identification result of the game media, as constitution example information (e.g., a record shown in FIG. 6) which indicates a constitution example of the aggregate, in predetermined constitution example data (D3) for each of the aggregates (S21 to S25); and estimating a frequent-use media group which is a combination of game media included in the aggregate with a relatively high frequency, as an element representing at least a part of the tendency, based on the constitution example data (S31 to S38).

When the game media are combined to constitute the aggregate, the constitution of the aggregate may change in various ways depending on the concept (way of thinking, idea, thought) of the player, for example, a strategy, a policy or the like. For example, the constitution (composition) of the aggregate changes depending on whether attack or defense is emphasized. On the other hand, the aggregate often includes a game medium or media which will probably play a central role or roles in realizing the player's concept. Therefore, if aggregates are prepared by players who have generally the same or similar concept, or aggregates are similar, it is relatively likely to include a combination of the same kind of game media. Therefore, the frequent-use media group estimated by the above-described aspect can be an index for classifying the player's concept regarding the constitution of the aggregate.

It should be noted that the computer program according to the aspect of the present invention may be provided in a state of being stored in a storage medium. If the storage medium is used and the computer program according to the present invention is installed and executed in a computer, for example, then it is possible to realize the system of the present invention using the computer. The storage medium in which the computer program is stored may be a nontemporary storage medium such as a CDROM.

In the above-described aspects, based on the constitution example data, the tendency estimation device may extract at least one game medium included in the aggregate with a relatively high frequency as a main medium (e.g., a key card), extract at least one game medium included in the aggregate with a relatively high frequency and associated with the main medium as an associated medium (media) (e.g., a sub-card or sub-cards), and estimate a combination of the main medium and the associated medium (media) as the frequent-use medium group.

The tendency estimation device may extract a plurality of main media, and extract each associated medium for each of the main media by distinguishing the associated media for each of the main media, and the tendency estimation device may classify the constitution examples for each of the aggregates recorded in the constitution example data into a plurality of similar groups according to similarity to the frequent-use media group, and estimate a model of the constitution examples of the aggregate for each of the obtained similar groups.

The tendency estimation device may further estimate a model of the constitution examples of the aggregate based on an estimation result of the frequent-use medium group.

The tendency estimation device may weigh the constitution example information based on identification status of the medium identification device for each of the aggregates and reflect the weighting in estimation of the frequent-use medium group.

The system may further comprise an information publication device (22) disclosing at least a portion of an estimation result of the tendency estimation device on a predetermined network.

In the above-described aspects, the constitution example recording device may acquire information of the game in that the aggregate is used as ancillary information, and record the obtained ancillary information in association with the identification result of the game medium, and the tendency estimation device may estimate the tendency based on the ancillary information such that information indicating characteristics of the tendency regarding the constitution of the aggregate is included in an estimation result.

The system may further comprise an evaluation device evaluating the aggregate constituted by the player based on an estimation result of the tendency estimation device.

What is claimed is:

1. A game tendency analysis system applied to a game in that a plurality of players compete against each other using an aggregate of a plurality of physical game media, and analyzing a tendency related to constitution of the aggregate used in the game, the game tendency analysis system comprising:

a medium identification device identifying at least a part of the physical game media included in the aggregate which is constituted to be used in the game by each player;

a constitution example recording device separately recording an identification result of the medium identification device, as constitution example information which indicates a constitution example of the aggregate, in predetermined constitution example data for each of the aggregates; and a tendency estimation device estimating a frequent-use media group as an element representing at least a part of the tendency, wherein, based on the constitution example data, the tendency estimation device extracts a plurality of game media which are included in the aggregate with relatively high frequencies as main media, extracts at least one game medium, which is included in the aggregate with a relatively high frequency and associated with each of the main media, as an associated medium by distinguishing the associated medium for each of the main media, and estimates a combination of each of the main media and the associated medium as the frequent-use medium group.

2. The game tendency analysis system according to claim 1, wherein the tendency estimation device classifies the constitution examples for each of the aggregates recorded in the constitution example data into a plurality of similar groups according to similarity to the frequent-use media group, and estimates a model of the constitution examples of the aggregate for each of the similar groups.

3. The game tendency analysis system according to claim 1, wherein the tendency estimation device weighs the constitution example information based on identification status of the medium identification device for each of the aggregates and reflects weighting in estimation of the frequent-use medium group.

4. The game tendency analysis system according to claim 1, further comprising an information publication device disclosing at least a portion of an estimation result of the tendency estimation device on a predetermined network.

5. The game tendency analysis system according to claim 1, wherein the constitution example recording device acquires information of the game in which the aggregate is used as ancillary information, and records the ancillary information in association with the identification result of the medium identification device, and the tendency estimation device estimates the tendency based on the ancillary information such that information indicating characteristics of the tendency regarding the constitution of the aggregate is included in an estimation result.

6. The game tendency analysis system according to claim 1, further comprising an evaluation device evaluating the aggregate constituted by the player based on an estimation result of the tendency estimation device.

7. A game tendency analysis system applied to a game in that a plurality of players compete against each other using an aggregate of a plurality of physical game media, and analyzing a tendency related to constitution of the aggregate used in the game, the game tendency analysis system comprising, a medium identification device identifying at least a part of the physical game media included in the aggregate which is constituted to be used in the game by each player;

a constitution example recording device separately recording an identification result of the medium identification device, as constitution example information which indicates a constitution example of the aggregate, in predetermined constitution example data for each of the aggregates; and a tendency estimation device estimating a frequent-use media group which is a combination of game media included in the aggregate with a relatively high frequency, as an element representing at least a part of the tendency, based on the constitution example data, wherein the tendency estimation device further estimates a model of the constitution examples of the aggregate based on an estimation result of the frequent-use medium group.

8. A non-transitory computer readable recording medium having a computer program for use with a game tendency analysis system, which is applied to a game in that a plurality of players compete against each other using an aggregate of a plurality of physical game media and which analyzes a tendency related to constitution of the aggregate used in the game, the computer program configured to cause a computer of the game tendency analysis system to function as:

a medium identification device identifying at least a part of the physical game media included in the aggregate which is constituted to be used in the game by each player;

a constitution example recording device separately recording an identification result of the medium identification device, as constitution example information which indicates a constitution example of the aggregate, in predetermined constitution example data for each of the aggregates; and a tendency estimation device estimating a frequent-use media group as an element representing at least a part of the tendency, wherein, based on the constitution example data, the tendency estimation device extracts a plurality of game media which are included in the aggregate with relatively high frequencies as main media, extracts at least one game medium, which is included in the aggregate with a relatively high frequency and associated with each of the main media, as an associated medium by distinguishing the associated medium for each of the main media, and estimates a combination of each of the main media and the associated medium as the frequent-use medium group.

9. An analysis method for use with a game tendency analysis system, which is applied to a game in that a plurality of players compete against each other using an aggregate of a plurality of physical game media, and which analyzes a tendency related to constitution of the aggregate used in the game, the analysis method comprising:

identifying at least a part of the physical game media included in the aggregate which is constituted to be used in the game by each player;

separately recording an identification result of the physical game media, as constitution example information which indicates a constitution example of the aggregate, in predetermined constitution example data for each of the aggregates;

extracting, based on the constitution example data, a plurality of game media which are included in the aggregate with relatively high frequencies as main media, and extracting at least one game medium, which is included in the aggregate with a relatively high frequency and associated with each of the main media, as an associated medium by distinguishing the associated medium for each of the main media; and estimating a frequent-use media group which is a combination of each of the main media and the associated medium, as an element representing at least a part of the tendency.

* * * * *